US008446612B2

(12) United States Patent
Fuse

(10) Patent No.: US 8,446,612 B2
(45) Date of Patent: May 21, 2013

(54) IMAGE FORMING APPARATUS COMPRISING PATTERN ADDING FUNCTION

(75) Inventor: Hiroyuki Fuse, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/038,325

(22) Filed: Mar. 1, 2011

(65) Prior Publication Data
US 2011/0235084 A1 Sep. 29, 2011

Related U.S. Application Data

(60) Provisional application No. 61/318,709, filed on Mar. 29, 2010, provisional application No. 61/318,718, filed on Mar. 29, 2010.

(51) Int. Cl.
*G06K 15/00* (2006.01)
(52) U.S. Cl.
USPC ......... 358/1.14; 358/3.28; 382/165; 382/182; 382/214
(58) Field of Classification Search
USPC .............................................. 358/1.14, 3.28
See application file for complete search history.

(56) References Cited

U.S. PATENT DOCUMENTS

| 5,737,100 | A | 4/1998 | Funada et al. | |
|---|---|---|---|---|
| 5,742,408 | A | 4/1998 | Funada et al. | |
| 7,873,183 | B2* | 1/2011 | He et al. | 382/100 |
| 2004/0120544 | A1* | 6/2004 | Eguchi et al. | 382/100 |
| 2009/0006922 | A1* | 1/2009 | Yoshida | 714/755 |
| 2010/0002267 | A1* | 1/2010 | Mikami | 358/3.28 |

* cited by examiner

*Primary Examiner* — Benny Q Tieu
*Assistant Examiner* — Juan M Guillermety
(74) *Attorney, Agent, or Firm* — Patterson & Sheridan, LLP

(57) ABSTRACT

An image forming apparatus includes: a storage unit including unique information identify to an apparatus main unit; a setting unit including setting information of the apparatus main unit instead of the unique information; a pattern addition unit that adds an addition pattern based on a unique pattern generated from the unique information or a setting pattern generated from the setting information to image data that is input to the apparatus main unit; an image formation unit that forms a visual image of the image data and an addition image of the addition pattern which is hardly recognized by eyes on a recording medium; and a control unit that changes the addition pattern formed by the image formation unit from the unique pattern to the setting pattern when an error depending on the unique information occurs.

19 Claims, 5 Drawing Sheets

IMAGE FORMING APPARATUS COMPRISING PATTERN ADDING FUNCTION

CROSS-REFERENCE TO RELATED APPLICATION

This application is based upon and claims the benefit of priority from Provisional U.S. Applications 61/318,709 filed on Mar. 29, 2010 and 61/318,718 filed on Mar. 29, 2010, the entire contents of which are incorporated herein by reference.

FIELD

Embodiments described herein relate to an image forming apparatus that can identify an apparatus used for image formation by adding a particular pattern to an image pattern during print.

BACKGROUND

There are image forming apparatuses having a function of enabling a used image forming apparatus to be identified from a print image. The identification of the image forming apparatus is effective in the investigation of criminal acts such that the apparatus is illegally used to forge paper money or securities. In order to identify the image forming apparatus used for print, there are image forming apparatuses that make prints by adding a particular pattern that is hardly recognized by human's eyes to an image pattern. In the image forming apparatus that makes prints by adding the particular pattern to the image pattern, up to now, although a print function of the image forming apparatus is normal, if the function of adding the particular pattern is abnormal or there occurs an abnormality caused by data of the particular pattern, print operation per se by the image forming apparatus is prohibited.

However, although the print function is normal, if the use of the image forming apparatus is prohibited because only the function of investigating a few illegal persons are abnormal, there is a risk that inconvenience is forced on a large majority of honest users.

From this viewpoint, there is desired development of the image forming apparatus that provides convenience of a user so that the image forming apparatus can be used while providing the function for investigating the illegal user, if the print function is normal even though the function for identifying the image forming apparatus used for print is abnormal.

DETAILED DESCRIPTION

According to an embodiment, there is provided an apparatus including: a storage unit including unique information identify to an apparatus main unit; a setting unit including setting information of the apparatus main unit instead of the unique information; a pattern addition unit that adds an addition pattern based on a unique pattern generated from the unique information or a setting pattern generated from the setting information to image data that is input to the apparatus main unit; an image formation unit that forms a visual image of the image data and an addition image of the addition pattern which is hardly recognized by eyes on a recording medium; and a control unit that changes the addition pattern formed by the image formation unit from the unique pattern to the setting pattern when an error depending on the unique information occurs.

Hereinafter, embodiments will be described.

[First Embodiment]

Figure 1:
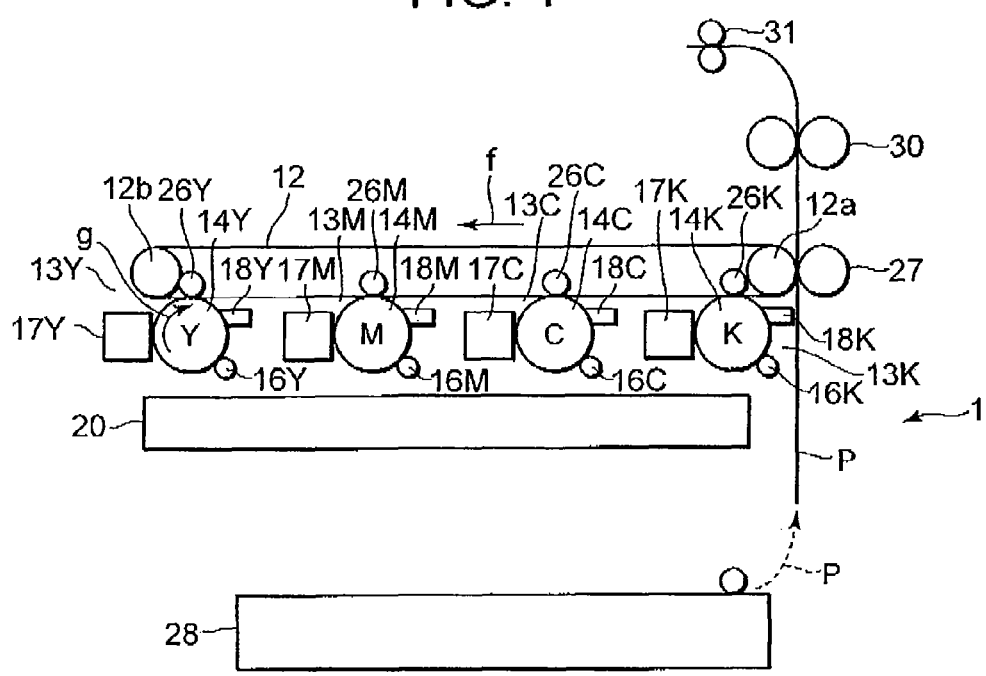
FIG. 1 is a schematic configuration diagram illustrating a main portion of a color printer according to a first embodiment.

FIG. 1 illustrates a main portion of a 4-drum tandem color printer 1 that is an image forming apparatus according to a first embodiment. The color printer 1 includes four sets of image formation stations 13Y, 13M, 13C, and 13K, which configure image formation units arranged in parallel along a lower side of a transfer belt 12. The image formation stations 13Y, 13M, 13C, and 13K include photoconductive drums 14Y, 14M, 14C, and 14K, respectively. The image formation stations 13Y, 13M, 13C, and 13K form toner images of Y (yellow), M (magenta), C (cyan), and K (black) on the photoconductive drums 14Y, 14M, 14C, and 14K, respectively.

The image formation stations 13Y, 13M, 13C, and 13K include chargers 16Y, 16M, 16C, and 16K, developing devices 17Y, 17M, 17C, and 17K, and photoconductive cleaners 18Y, 18M, 18C, and 18K around the photoconductive drums 14Y, 14M, 14C, and 14K, respectively.

The color printer 1 includes a laser exposure device configuring the image formation unit. The laser exposure device 20 irradiates the photoconductive drums 14Y, 14M, 14C, and 14K between the chargers 16Y, 16M, 16C, and 16K and the developing devices 17Y, 17M, 17C, and 17K with laser beams corresponding to the respective colors to form electrostatic latent images on the photoconductive drums 14Y, 14M, 14C, and 14K. The developing devices 17Y, 17M, 17C, and 17K form toner images of Y (yellow), M (magenta), C (cyan), and K (black) on the photoconductive drums 14Y, 14M, 14C, and 14K, respectively.

The color printer 1 includes a backup roller 12a and a driven roller 12b between which the transfer belt 12 extends, and allows the transfer belt 12 to travel in a direction of an arrow f. The color printer 1 includes primary transfer rollers 26Y, 26M, 26C, and 26K at positions facing the photoconductive drums 14Y, 14M, 14C, and 14K through the transfer belt 12, respectively. The primary transfer rollers 26Y, 26M, 26C, and 26K primarily transfer the toner images onto the photoconductive drums 14Y, 14M, 14C and 14K to the transfer belt 12 superimpose on top of another. The photoconductive cleaners 18Y, 18M, 18C, and 18K remove toner remaining on the photoconductive drums 14Y, 14M, 14C, and 14K, respectively, after primary transfer, and recover the removed toner.

The color printer 1 includes a secondary transfer roller 27 at a secondary transfer position facing the backup roller 12a through the transfer belt 12. The color printer 1 secondarily transfers the toner images on the transfer belt 12 to a sheet P fed from a sheet feed unit 28 at a nip between the transfer belt 12 and the secondary transfer roller 27 in a lump. The color printer 1 includes a fuser unit 30 and a sheet discharge roller 31 downstream of the secondary transfer roller 27 along a transport direction of the sheet P. The color printer 1 fixes the toner image on the sheet P through the fixing device 30, and discharges the sheet P through the sheet discharge roller 31.

The image forming apparatus may be, for example, a revolver-type printer or an inkjet printer.

Figure 2:
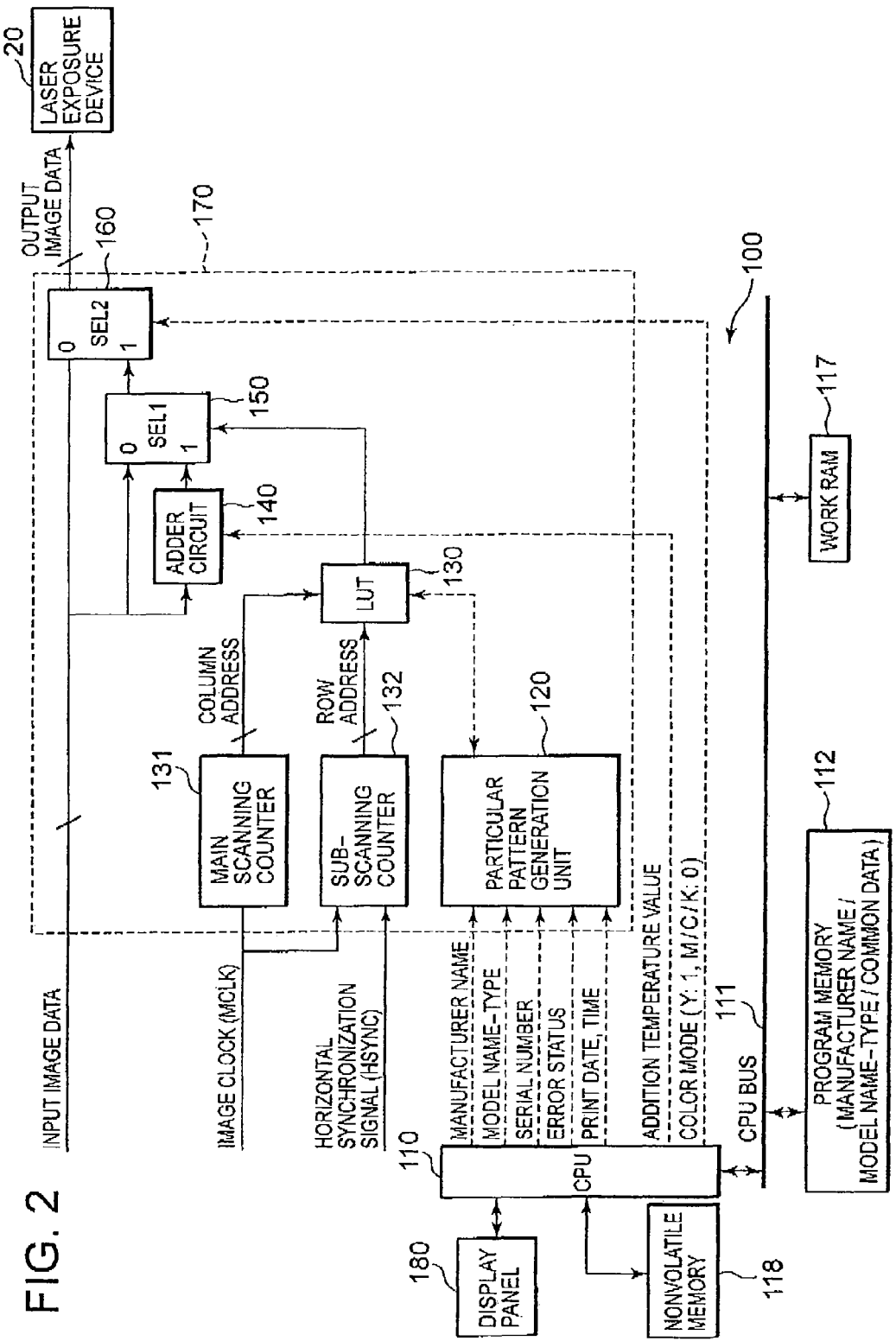
FIG. 2 is a block diagram of a control system that mainly includes a pattern adding function in the color printer according to the first embodiment.

Subsequently, addition of the addition pattern to the image data will be described. FIG. 2 illustrates a block diagram of a control system 100 that mainly includes a pattern addition function in the color printer 1. A CPU 110 that is a control unit of the color printer 1 includes a program memory 112 and a work RAM 117, which are setting units connected to the color printer 1 through a CPU bus 111. The program memory 112 stores, for example, a manufacturer name and a model name-type, which are setting information incorporated therein for basic control of the color printer 1 in advance, as well as predetermined common data therein. Further, the program memory 112 stores an addition concentration value that is a concentration of the addition pattern, corresponding to the image data to be input to the color printer 1. A manufacturer code may be stored as the setting information instead of the manufacturer name. The work RAM 117 stores the print operation of the color printer 1 therein.

The CPU 110 includes a nonvolatile memory 118 that is a storage unit. The nonvolatile memory 118 stores, for example, a manufacturer name, a model name-type, and serial number, which are unique information identify to the color printer 1 therein. The common data stored in the program memory 112 is different from serial number stored in the nonvolatile memory 118. Also, the common data cannot identify the respective color printers 1. The common data is used for control of the color printer 1 when an error depending on the unique information occurs. The common data is, for example, contents describing a fact that an error depending on the unique information of the color printer 1 occurs. The common data may be, for example, contents describing a production area of the color printer 1.

A particular pattern generation unit 120 of the control system 100 encodes the unique information or the setting information input from the CPC 110 into a bit map. The particular pattern generation unit 120 encodes a unique pattern that is the addition pattern from the unique information, encodes the setting pattern which is the addition pattern from the setting information, and outputs the encoded patterns to a lookup table 130.

The control system 100 includes a main scanning counter 131 and a sub-scanning counter 132. An image clock (MCLK) for transferring an image is input to the main scanning counter 131 and the sub-scanning counter 132. A horizontal synchronization signal (HSYNC) that synchronizes a scanning start is input to the sub-scanning counter 132. The main scanning counter 131 inputs a column address to the lookup table 130, and the sub-scanning counter 132 inputs a row address to the lookup table 130.

The control system 100 includes an adder circuit 140 that receives the addition concentration value from the CPU 110, a first selector 150 that selects the image data and an image part of the lookup table 130, and a second selector 160 that selects the image data, and data from the first selector 150 in a color mode of yellow (Y).

The particular pattern generation unit 120, the lookup table 130, the main scanning counter 131, the sub-scanning counter 132, the adder circuit 140, the first selector 150, and the second selector 160 configure a pattern addition unit 170. The control system 100 adds the unique pattern or the addition pattern of the setting pattern formed with toner of yellow (Y) to the input image data through the pattern addition unit 170 to output the resultant data to the laser exposure device 20. In a print image formed on, for example, a sheet by the color printer 1, the addition pattern of yellow (Y) is added to a visual image of the image pattern formed on the basis of the image data. Toner of yellow (Y) that forms the addition pattern is low in contrast with a white sheet, and hardly recognized by human's eyes. Accordingly, when the print image on the sheet is viewed by a human, almost only the image pattern is visible.

At the time of investigating injustice when the color printer 1 is illegally used, for example, a print image is read by an addition pattern read device with the result that the addition pattern that is hardly recognized by eyes can be read.

Figure 3:
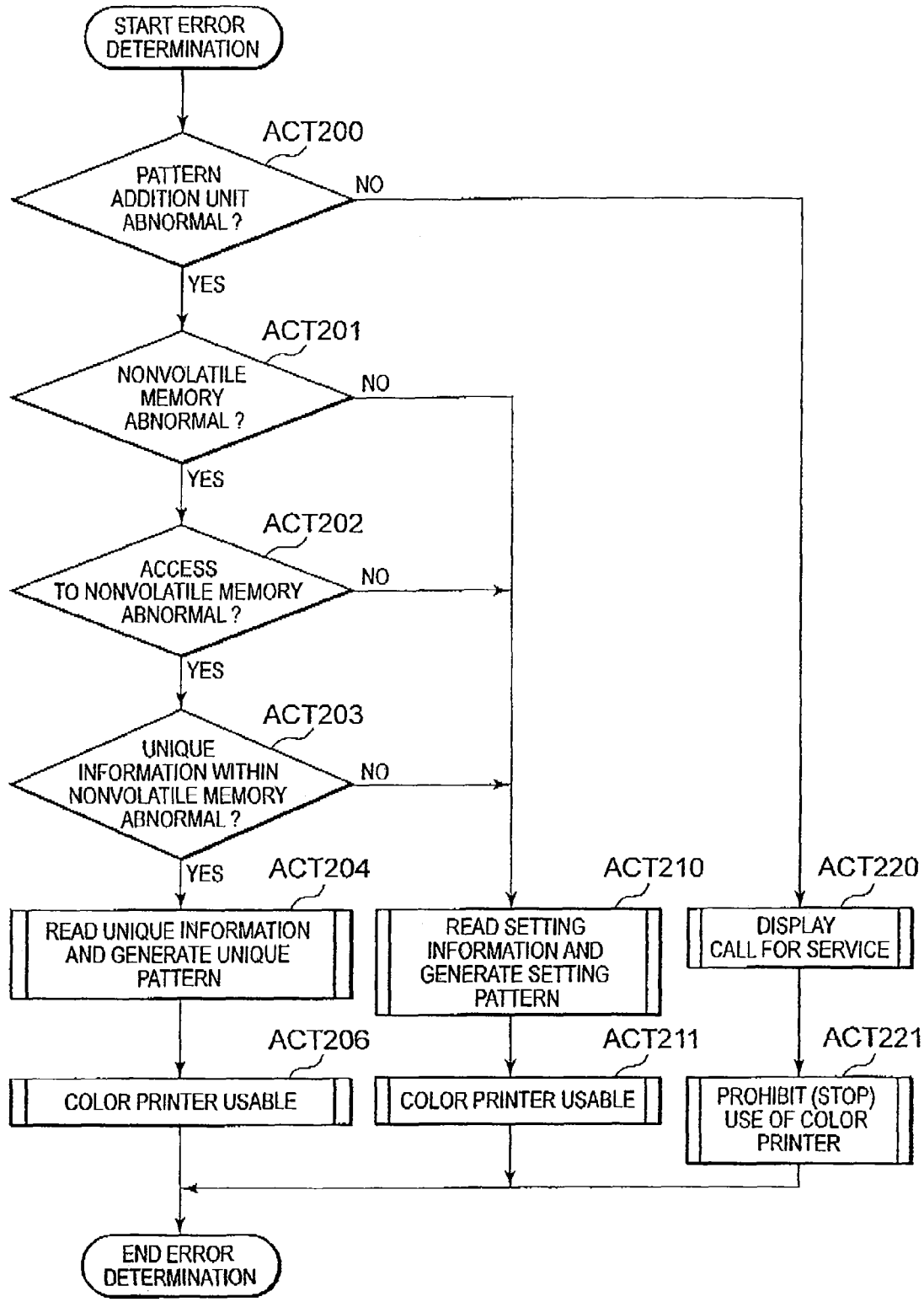
FIG. 3 is a flowchart showing error determination of an addition pattern according to the first embodiment.

The color printer 1 having the function of adding the addition pattern to the image data determines an error of the addition pattern upon starting print operation. FIG. 3 shows a flowchart of determining the error of the addition pattern. Upon starting the error determination, the CPU 110 detects whether the pattern addition unit 170 is abnormal, or not. When the particular pattern generation unit 120, the lookup table 130, the adder circuit 140, the first selector 150, and the second selector 160 normally function, the CPU 110 detects that the pattern addition unit 170 is not abnormal (yes in ACT 200). If the pattern addition unit 170 is abnormal (no in ACT 200), the CPU 110 advances to ACT 220.

If the pattern addition unit 170 is not abnormal (yes in ACT 200), the CPU 110 advances to ACT 201, and detects whether the nonvolatile memory 118 that stores the unique information therein is abnormal, or not. If the nonvolatile memory 118 is normal (yes in ACT 201), the CPU 110 advances to ACT 202, and detects whether an access to the nonvolatile memory 118 is abnormal, or not. If the nonvolatile memory 118 is abnormal (no in ACT 201), the CPU 110 advances to ACT 210.

If the access to the nonvolatile memory 118 can be normally achieved (yes in ACT 202), the CPU 110 advances to ACT 203, and detects whether the unique information within the nonvolatile memory 118 is abnormal, or not. If the access to the nonvolatile memory 118 is abnormal (no in ACT 202), the CPU 110 advances to ACT 210.

If all of the manufacturer name, the model name-type, and the serial number, which are the unique information within the nonvolatile memory 118 are normal (yes in ACT 203), the CPU 110 advances to ACT 204. If the unique information in the nonvolatile memory 118 is abnormal (no in ACT 203), the CPU 110 advances to ACT 210.

In ACT 204, the CPU 110 reads the unique information within the nonvolatile memory 118, and inputs the unique information having the manufacturer name, the model name-type, and the serial number to the particular pattern generation unit 120. The particular pattern generation unit 120 generates the unique pattern from the unique information. As a result, the CPU 110 makes the color painter 1 usable with addition of the unique pattern to the image data (ACT 206), and completes the error determination of the addition pattern.

After the error determination of the addition pattern has been completed, since there is no error depending on the unique information, the color printer 1 adds the unique pattern to the input image data to form an image. A print image formed by the color printer 1 is an image in which a visual image of the image pattern based on the image data, and the unique pattern hardly recognized by eyes are superimposed on each other.

If the pattern addition unit 170 is abnormal (no in ACT 200) when the error determination of the addition pattern is conducted, and the CPU 110 advances to ACT 220, the CPU 110 displays a call for service, for example, on a display panel 180 of the color printer 1 (ACT 220). Furthermore, the CPU 110 prohibits use of the color printer 1 (stops the color printer 1) (ACT 221), and completes the error determination of the addition pattern.

If the nonvolatile memory 118 is abnormal (no in ACT 201), the access to the nonvolatile memory 118 is abnormal (no in ACT 202), or the unique information within the nonvolatile memory 118 is abnormal (no in ACT 203), due to the error depending on the unique information when the error of the addition pattern is determined, the CPU 110 advances to ACT 210. In ACT 210, the CPU 110 changes the addition pattern added to the image data from the unique pattern to the setting pattern. The setting pattern is a pattern that does not include information (for example, serial number) unique to each main unit of the color printers 1, but is generated from information such as the manufacturer name, the model name-type, and the common data.

In ACT 210, the CPU 110 reads the manufacturer name, the model name-type, and the common data, which are the setting information within the program memory 112, and inputs the setting information to the particular pattern generation unit 120. The particular pattern generation unit 120 generates the setting pattern from the setting information. The CPU 110 makes the color printer 1 usable with addition of the setting pattern to the image data (ACT 211), and completes the error determination of the addition pattern.

Even though there are various errors depending on the unique information when the error of the addition pattern is determined, if the pattern addition unit 170 normally functions, the CPU 110 makes the color printer 1 usable without prohibiting the use of the color printer 1.

Since there is an error depending on the unique information, after the error of the addition pattern is determined, the color printer 1 adds the setting pattern instead of the unique pattern to the input image data to form an image. The print image formed by the color printer 1 is an image in which a visual image of the image pattern based on the image data, and the setting pattern hardly recognized by eyes are superimposed on each other.

For that reason, at the time of investigating injustice when the color printer 1 is illegally used, if the unique pattern having the serial number is added to the image pattern as the addition pattern, an investigator can identify one color printer 1 used for print. On the other hand, if the setting pattern having the manufacturer name, the model name-type, and predetermined common data is added to the image pattern as the addition pattern at the time of investigating injustice, the investigator cannot identify one color printer that has been used for print. However, the investigator can identify the manufacturer name and the model name-type from the setting pattern, and can further identify a fact that no unique pattern is added due to the error.

According to the first embodiment, when the print function of the color printer 1 is normal during print, if the pattern addition unit 170 is abnormal, the CPU 110 prohibits the use of the color printer 1. If the print function of the color printer 1 and the pattern addition unit 170 are normal, and an error depending on the unique information occurs, the CPU 110 does not prohibit the use of the color printer 1, but changes the addition pattern added to the image data from the unique pattern to the setting pattern having the manufacturer name, the model name-type, and predetermined common data so that the color printer 1 is useable.

Even though an error depending on the unique information occurs, the user can use the color printer 1, and obtains convenience. On the other hand, even though there is an error depending on the unique information, the CPU 110 adds the setting pattern as the addition pattern instead of the unique pattern to the image pattern. Accordingly, the investigator cannot identify one color printer used for print at the time of investigating injustice, but can identify the manufacturer name and the model name-type of the color printer used for print, which is helpful in investigation.

[Second Embodiment]

Next, a second embodiment will be described. The second embodiment is different from the above-mentioned first embodiment in the contents of the setting information. In the second embodiment, the same configurations as those described in the above-mentioned first embodiment are denoted by identical symbols, and a detailed description thereof will be omitted.

In the second embodiment, error statuses for identifying various errors depending on the unique information are provided as the setting information instead of the unique information. In the second embodiment, the CPU 110 saves the error statuses of the various errors occurring while the color printer 1 is being driven in the work RAM 117. As a result, the setting information includes the manufacturer name and the model name-type stored in the program memory 112, and the error statuses stored in the work RAM 117.

If the pattern addition unit 170 is abnormal when the error determination is conducted, the CPU 110 stores, for example, 1 in bit 3 of the work RAM 117 as the error status. Likewise, the CPU 110 stores 1 in bit 0 if the nonvolatile memory 118 is abnormal, stores 1 in bit 1 if the access to the nonvolatile memory 118 is abnormal, and stores 1 in bit 2 if the unique information in the nonvolatile memory 118 is abnormal.

Figure 4:
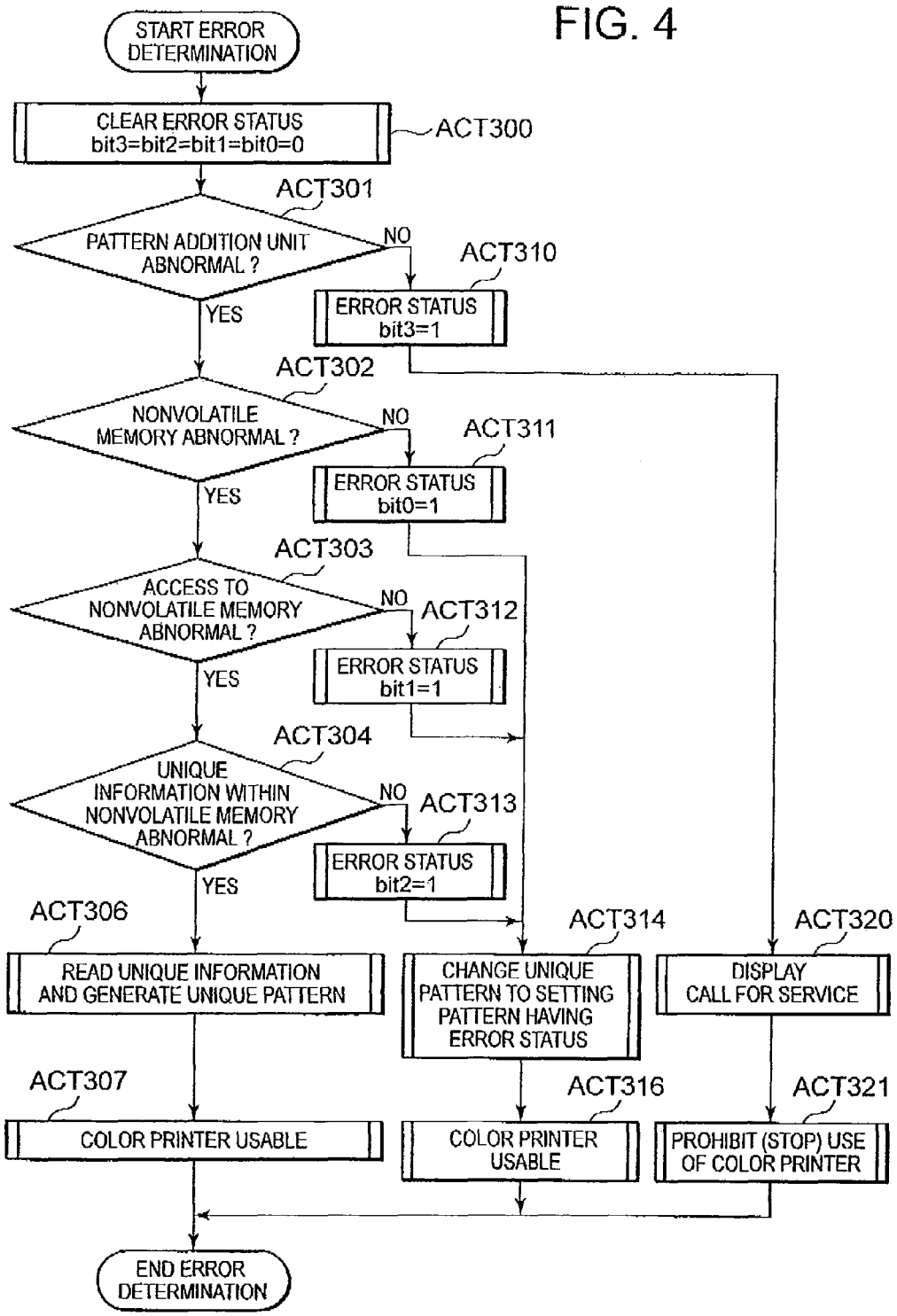
FIG. 4 is a flowchart showing error determination of an addition pattern according to a second embodiment.

FIG. 4 shows a flowchart for determining the error of the addition pattern. When the error determination starts, the CPU 110 sets all of bit 3, bit 0, bit 1, and bit 2 in the work RAM 117 to 0, and clears the error statuses (ACT 300). Then, the CPU 110 detects whether the pattern addition unit 170 is abnormal, or not. If the pattern addition unit 170 is not abnormal (yes in ACT 301), the CPU 110 advances to ACT 302, and detects whether the nonvolatile memory 118 is abnormal, or not. If the pattern addition unit 170 is abnormal (no in ACT 301), the CPU 110 advances to ACT 310.

If the nonvolatile memory 118 is normal (yes in ACT 302), the CPU 110 advances to ACT 303, and detects whether the access to the nonvolatile memory 118 is abnormal, or not. If the nonvolatile memory 118 is abnormal (no in ACT 302), the CPU 110 advances to ACT 311.

If the access to the nonvolatile memory 118 can be normally performed (yes in ACT 303), the CPU 110 advances to ACT 304, and detects whether the unique information in the nonvolatile memory 118 is abnormal, or not. If the access to the nonvolatile memory 118 is abnormal (no in ACT 303), the CPU 110 advances to ACT 312.

If all of the manufacturer name, the model name-type, and the serial number, which are the unique information within the nonvolatile memory 118 are normal (yes in ACT 304), the CPU 110 advances to ACT 306. If the unique information in the nonvolatile memory 118 is abnormal (no in ACT 304), the CPU 110 advances to ACT 313.

In ACT 306, the CPU 110 reads the unique information within the nonvolatile memory 118, and inputs the unique information having the manufacturer name, the model name-type, and the serial number to the particular pattern generation unit 120. The particular pattern generation unit 120 generates the unique pattern from the unique information. As a result, the CPU 110 makes the color printer 1 usable with addition of the unique pattern to the image data (ACT 307), and completes the error determination of the addition pattern.

If the pattern addition unit 170 is abnormal at the time of determining the error of the addition pattern (no in ACT 301), and the CPU 110 advances to ACT 310, the CPU 110 stores 1 in bit 3 of the work RAM 117. Then, the CPU 110 displays a call for service on the display panel 180 of the color printer 1

(ACT 320), prohibits the use of the color printer 1 (ACT 321), and completes the error determination of the addition pattern.

If the nonvolatile memory 118 is abnormal due to the error depending on the unique information at the time of determining the error of the addition pattern (no in ACT 302), the CPU 110 stores 1 in bit 0 of the work RAM 117 (ACT 311). If the access to the nonvolatile memory 118 is abnormal (no in ACT 303), the CPU 110 stores 1 in bit 1 of the work RAM 117 (ACT 312). Or, if the unique information within the nonvolatile memory 118 is abnormal (no in ACT 304), the CPU 110 stores 1 in bit 2 of the work RAM 117 (ACT 313). Then, the CPU 110 advances to ACT 314.

In ACT 314, the CPU 110 changes the addition pattern added to the image data from the unique pattern to the setting pattern. The setting pattern is a pattern that does not include information (for example, serial number) unique to each main unit of the color printers 1, but is generated from information such as the manufacture name, the model name-type, or the common data.

In ACT 314, the CPU 110 reads the manufacturer name and the model name-type which is the setting information within the program memory 112, and the error statuses which is the setting information within the work RAM 117, and inputs the setting information to the particular pattern generation unit 120. The particular pattern generation unit 120 generates the setting pattern from the setting information. The CPU 110 makes the color printer 1 usable with addition of the setting pattern to the image data (ACT 316), and completes the error determination of the addition pattern.

Accordingly, even though there are various errors depending on the unique information at the time of determining the error of the addition pattern, the CPU 110 makes the color printer 1 usable without prohibiting the use of the color printer 1 if the pattern addition unit 170 normally functions.

If there is an error depending on the unique information, the setting pattern based on the setting information having the manufacturer name, the model name-type, and the error statuses is added, instead of the unique pattern based on the unique information, to the image pattern based on the image data printed by the color printer 1. For that reason, at the time of investigating injustice when the color printer 1 is illegally used, the investigator cannot identify one color printer 1 used for print. However, the investigator can identify the manufacturer name and the model name-type from the setting pattern instead of the unique pattern, and can further identify a fact that no unique pattern is added due to the error.

According to the second embodiment, when the print function of the color printer 1 is normal during print, if the pattern addition unit 170 is abnormal, the CPU 110 prohibits the use of the color printer 1. If the print function of the color printer 1 and the pattern addition unit 170 are normal, and the error depending on the unique information occurs, the CPU 110 changes the addition pattern added to the image data from the unique pattern to the setting pattern having the manufacturer name, the model name-type, and the error statuses without prohibiting the use of the color printer 1, and makes the color printer 1 usable.

Even though the error depending on the unique information occurs, the user can use the color printer 1 and obtains the convenience. On the other hand, even though the error depending on the unique information occurs, the CPU 110 adds the setting pattern to the image pattern instead of the unique pattern as the addition pattern. Accordingly, if the color printer 1 is illegally used, the manufacturer name and the model name-type of the color printer 1 used for print can be identified at the time of investigating injustice, which is helpful in the investigation. Also, the error status is found, which is helpful in repairing an abnormal portion.

[Third Embodiment]

Subsequently, a third embodiment will be described. The third embodiment is different from the above-mentioned second embodiment in the contents of the setting information. In the third embodiment, the same configurations as those described in the above-mentioned second embodiment are denoted by identical symbols, and a detailed description thereof will be omitted.

In the third embodiment, the manufacturer name, the model name-type, and date and time at the time of printing, which is an image formation time, are provided as the setting information instead of the unique information.

Figure 5:
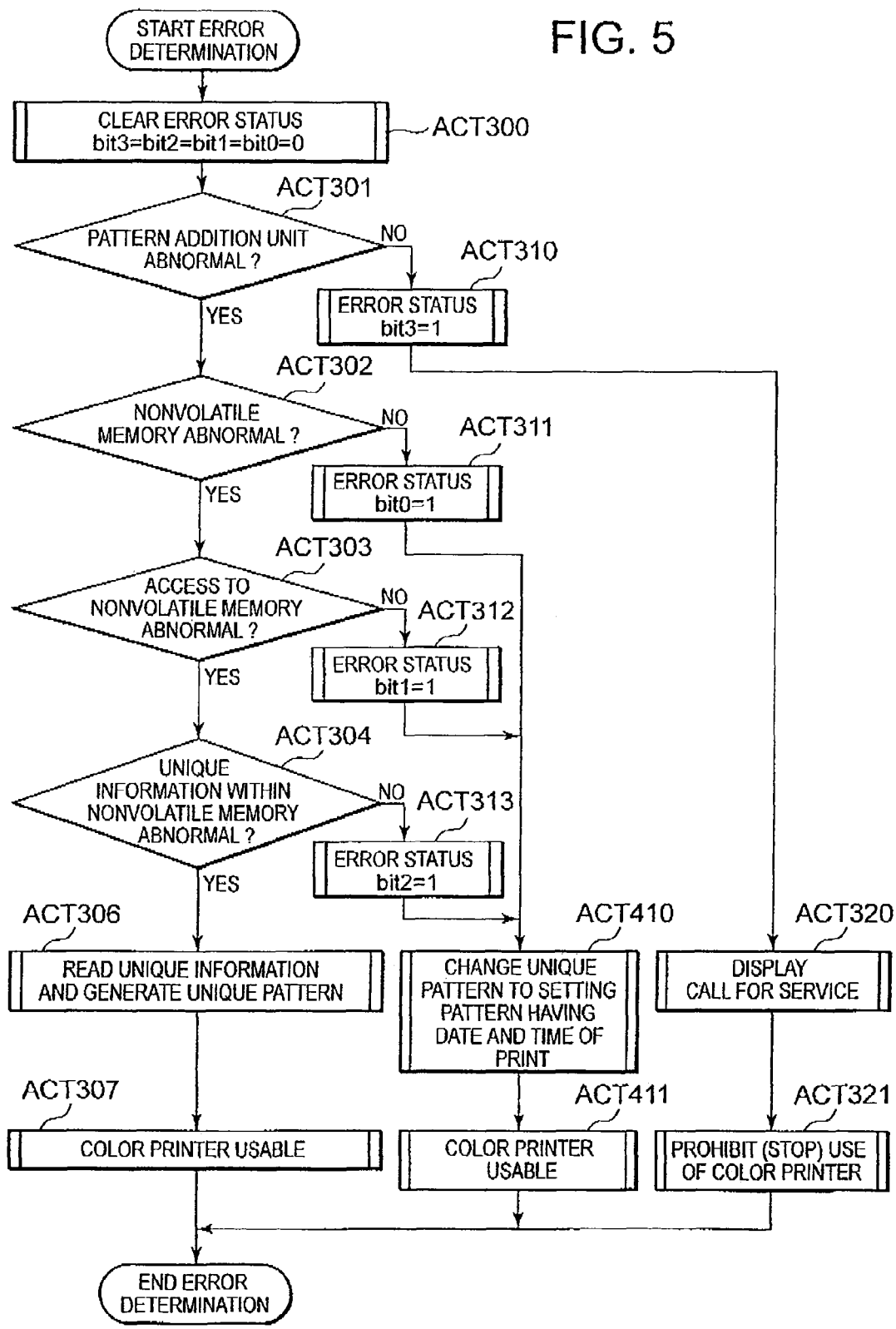
FIG. 5 is a flowchart showing error determination of an addition pattern according to a third embodiment.

FIG. 5 shows a flowchart for determining the error of the addition pattern. The error determination is implemented substantially in the same manner as that of the error determination in the second embodiment. At the time of determining the error of the addition pattern, if the nonvolatile memory 118 is abnormal (no in ACT 302) due to the error depending on the unique information, the CPU 110 stores 1 in bit 0 of the work RAM 117 (Act 311). If the access to the nonvolatile memory 118 is abnormal (no in ACT 303), the CPU 110 stores 1 in bit 1 of the work RAM 117 (ACT 312). Or, if the unique information within the nonvolatile memory 118 is abnormal (no in ACT 304), the CPU 110 stores 1 in bit 2 of the work RAM 117 (ACT 313). The CPU 110 then advances to ACT 410.

In ACT 410, the CPU 110 changes the addition pattern added to the image data from the unique pattern to the setting pattern. The setting pattern is a pattern that does not include information (for example, serial number) unique to each main unit of the color printers 1, but is generated from information such as the manufacturer name, the model name-type, or the common data.

In ACT 410, the CPU 110 reads the manufacturer name, the model name-type and date and time at the time of printing within the program memory 112, as the setting information, and inputs the setting information to the particular pattern generation unit 120. The particular pattern generation unit 120 generates the setting pattern from the setting information. The CPU 110 makes the color printer 1 usable with addition of the setting pattern to the image data (ACT 411), and completes the error determination of the addition pattern.

Accordingly, even though there are various errors depending on the unique information at the time of determining the error of the addition pattern, the CPU 110 makes the color printer 1 usable without prohibiting the use of the color printer 1 if the pattern addition unit 170 normally functions.

If there is an error depending on the unique information, the setting pattern based on the setting information having the manufacturer name, the model name-type, and date and time at the time of printing is added, instead of the unique pattern based on the unique information, to the image pattern based on the image data printed by the color printer 1. For that reason, at the time of investigating injustice when the color printer 1 is illegally used, the investigator cannot identify one color printer 1 used for print. However, the investigator can identify the manufacturer name and the model name-type from the setting pattern instead of the unique pattern, and can further identify date and time at the time of printing.

According to the third embodiment, when the print function of the color printer 1 is normal during print, if the pattern addition unit 170 is abnormal, the CPU 110 prohibits the use of the color printer 1. If the print function of the color printer 1 and the pattern addition unit 170 are normal, and the error depending on the unique information occurs, the CPU 110 changes the addition pattern added to the image data from the unique pattern to the setting pattern having the manufacturer name, the model name-type, and date and time at the time of printing without prohibiting the use of the color printer 1, and makes the color printer 1 usable.

Even though the error depending on the unique information occurs, the user can use the color printer 1 and obtains the convenience. On the other hand, even though the error depending on the unique information occurs, the CPU 110 adds the setting pattern as the addition pattern to the image pattern instead of the unique pattern. Accordingly, if the color printer 1 is illegally used, the manufacturer name and the model name-type of the color printer 1 used for print as well as date and time at the time of printing can be identified at the time of investigating injustice, which is helpful in the investigation.

According to at least one of the above embodiments, even though the error depending on the unique information for identifying a certain color printer 1 occurs, if the print function and the pattern addition unit 170 are normal, the user can use the color printer 1, and obtains convenience. Moreover, when the illegal use of the color printer is investigated, at least the manufacturer name, and the model name-type of the applied color printer 1 can be identified, which is helpful in investigation.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. An image forming apparatus, comprising:
a storage unit including unique information identify to an apparatus main unit;
a setting unit including setting information of the apparatus main unit instead of the unique information;
a pattern addition unit that adds an addition pattern based on a unique pattern generated from the unique information or a setting pattern generated from the setting information to image data that is input to the apparatus main unit;
an image formation unit that forms a visual image of the image data and an addition image of the addition pattern which is hardly recognized by eyes on a recording medium; and
a control unit that changes the addition pattern formed by the image formation unit from the unique pattern to the setting pattern when an error depending on the unique information occurs.

2. The apparatus according to claim 1, further comprising: a pattern generation unit that generates the addition pattern based on any one of the unique pattern generated from the unique information and the setting pattern generated from the setting information.

3. The apparatus according to claim 1, wherein the unique information includes a manufacturer name of the apparatus main unit, a model name-type of the apparatus main unit, and identification data for identifying the apparatus main unit.

4. The apparatus according to claim 3, wherein the identification data includes a serial number of the apparatus main unit.

5. The apparatus according to claim 1, wherein the setting information includes a manufacturer name of the apparatus main unit, a model name-type of the apparatus main unit, and common data.

6. The apparatus according to claim 1, wherein the setting information includes a manufacturer name of the apparatus main unit, a model name-type of the apparatus main unit, and error data derived from the error occurrence of the apparatus main unit.

7. The apparatus according to claim 6, wherein the error data includes status data indicative of a state of the error occurrence of the apparatus main unit.

8. The apparatus according to claim 6, wherein the error data includes time data indicative of an image formation time of the image formation, unit.

9. The apparatus according to claim 1, wherein the error occurrence depending on the unique information is caused by one of abnormality of the storage unit, abnormality of access to the storage unit, and abnormality of the unique information.

10. The apparatus according to claim 1, wherein the image formation in the image formation unit is stopped when an error occurs in the pattern addition unit.

11. An image forming method, comprising:
generating a unique pattern from unique information identify to an apparatus main unit;
adding the unique pattern to image data input to the apparatus main unit;
forming a visual image of the image data and an image of the unique pattern which is hardly recognized by eyes on a recording medium; and
generating a setting pattern from setting information of the apparatus main unit instead of the unique information when the error depending on the unique information occurs;
adding the setting pattern to the image data; and
forming the visible image of the image data and an image of the setting pattern which is hardly recognized by eyes on a recording medium.

12. The method according to claim 11, wherein the unique pattern or the setting pattern is generated by the same pattern generation unit.

13. The method according to claim 11, wherein the unique information includes a manufacturer name of the apparatus main unit, a model name-type of the apparatus main unit, and identification data for identifying the apparatus main unit.

14. The method according to claim 13, wherein the identification data comprises a serial number of the apparatus main unit.

15. The method according to claim 11, wherein the setting information includes a manufacturer name of the apparatus main unit, a model name-type of the apparatus main unit, and common data.

16. The method according to claim 11, wherein the setting information includes a manufacturer name of the apparatus main unit, a model name-type of the apparatus main unit, and error data derived from the error occurrence of the apparatus main unit.

17. The method according to claim 16, wherein the error data includes status data indicative of a state of the error occurrence of the apparatus main unit.

18. The method according to claim 16, wherein the error data includes time data indicative of an image formation time of the image formation unit.

19. The method according to claim 11, wherein the formation of the visual image of the image data on the recording medium is stopped when the error depending on the addition of the unique pattern to the image pattern occurs.

* * * * *